United States Patent [19]

Tso

[11] Patent Number: 5,253,836
[45] Date of Patent: Oct. 19, 1993

[54] CLAMP FOR FASTENING A SHELL WHICH ENCOMPASSES A TRACKBALL TO A KEYBOARD OF A LAPTOP COMPUTER

[76] Inventor: Shih Y. Tso, 11th Fl., No. 116, Sec. 2, Nanking E. Rd., Taipei, Taiwan

[21] Appl. No.: 882,485

[22] Filed: May 13, 1992

[51] Int. Cl.[5] .............................................. F16M 13/00
[52] U.S. Cl. .......................... 248/225.31; 248/442.2; 248/918
[58] Field of Search ............... 248/231.4, 225.31, 918, 248/442.2, 229, 316.4; 273/148 B; 400/715, 717, 718; 340/710, 711

[56] References Cited

U.S. PATENT DOCUMENTS

| | | | |
|---|---|---|---|
| 739,259 | 9/1903 | Hock | 400/717 X |
| 1,655,444 | 1/1928 | Tiritter | 248/225.31 |
| 2,716,533 | 8/1955 | Freeman | 248/224.2 X |
| 4,760,986 | 8/1988 | Harrison | 248/225.31 |
| 4,913,387 | 4/1990 | Tice | 248/918 |
| 4,952,919 | 8/1990 | Nippoldt | 273/148 B X |

FOREIGN PATENT DOCUMENTS

| | | | |
|---|---|---|---|
| 680696 | 2/1964 | Canada | 248/316.4 |
| 1090407 | 11/1960 | Fed. Rep. of Germany | 248/224.2 |

*Primary Examiner*—Karen J. Chotkowski
*Attorney, Agent, or Firm*—Fay, Sharpe, Beall, Fagan, Minnich & McKee

[57] ABSTRACT

A clamp for fastening a shell which encompasses a trackball to a keyboard. The clamp has a tray having a dovetail for engaging with a dovetail slot of the shell, a replaceable buckle strip with a bent portion to be inserted in a clearance between keys and a margin of the keyboard, and a spring-biased element for abutting the margin, so that the buckle strip cooperates with the spring-biased element to clamp the margin, thereby maintaining the shell in a stable position relative to the keyboard.

5 Claims, 3 Drawing Sheets

CLAMP FOR FASTENING A SHELL WHICH ENCOMPASSES A TRACKBALL TO A KEYBOARD OF A LAPTOP COMPUTER

BACKGROUND OF THE INVENTION

The present invention relates to a clamp for fastening a shell which encompasses a trackball to a keyboard of a laptop computer and, more particularly, to a clamp which has a replaceable buckle strip cooperating with a spring-biased element for clamping to the keyboard.

At the time being, laptop computers are widely used to help deal with business outside offices because of size and portability. For drawing, as supported software, a trackball is desired to cooperate with a laptop computer to thereby move a cursor more readily on a screen. Generally, as laptop computers and trackballs are used outside offices, plane surfaces can hardly be found to place the trackballs, especially when used in vehicles. Therefore, a trackball encompassed in a shell is usually sold with a clamp which is used for binding the shell to a keyboard, so that the trackball is maintained in a stable position relative to the keyboard.

Conventionally, a clamp bearing a shell which encompasses a trackball is secured to a keyboard with screws. The screws must be disengaged from the keyboard to release the clamp from the keyboard, so that the laptop computer, the keyboard, and the trackball can be packed in a business case more easily. It is relatively inconvenient to bring screw drivers to disengage the screws from the keyboard. Furthermore, a clamp made by a certain manufacturer usually does not fit a keyboard made by another manufacturer. The present invention is intended to overcome the above-mentioned drawbacks.

SUMMARY OF THE INVENTION

The present invention provides a clamp for fastening a shell which encompasses a trackball to a keyboard. The clamp has a tray having a dovetail for engaging with a dovetail slot of the shell, a replaceable buckle strip with a bent portion which is insertable in a clearance between keys and a margin of the keyboard, and a spring-biased element for abutting the margin, whereby the buckle strip cooperates with the spring-biased element to clamp the margin, thereby maintaining the shell in a stable position relative to the keyboard.

For a better understanding of the present invention and objects thereof, a study of the detailed description of the embodiments described hereinafter should be made in relation to the accompanying drawings.

DETAILED DESCRIPTION OF THE PREFERRED EMBODIMENT

Figure 1:
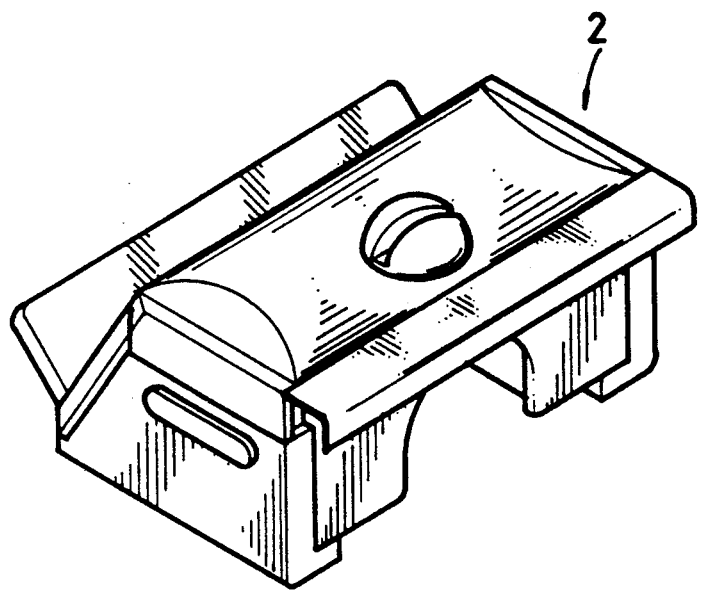
FIG. 1 is a perspective view of a clamp for fastening a shell which encompasses a trackball to a keyboard in accordance with, the present invention.

Referring to the drawings and, more particularly, to FIG. 1, in accordance with the instant invention, a clamp 2 for fastening a shell which encompasses a trackball to a keyboard is shown in a perspective view.

Figure 2:
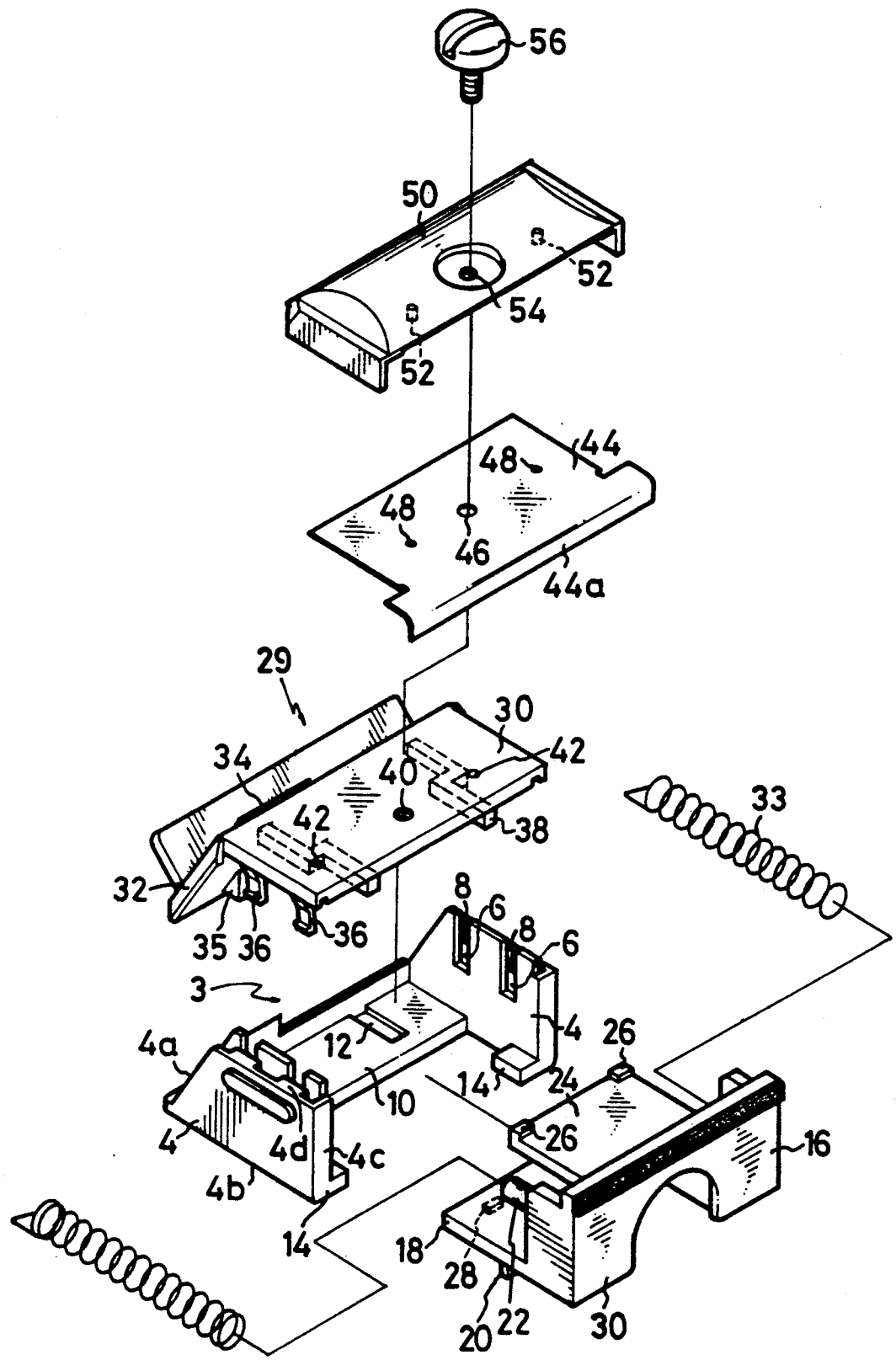
FIG. 2 is an exploded view of a clamp for fastening a shell which encompasses a trackball to a keyboard in accordance with the present invention.

Referring to FIG. 2, the clamp 2 has a base 3 having two opposite trapezoid walls 4 of which four edges are respectively referred to as 4a, 4b, 4c, and 4d, among which (a) the edge 4a is inclined, (b) the edges 4b and 4d are parallel to each other, and (c) the edge 4c is perpendicular to the edges 4b and 4d. Each wall 4 has a plurality of grooves 6 extending parallel to the edge 4C. In each groove 6, a cavity 8 is formed. The walls 4 are connected parallel to each other by an elongated member 10 from an intersection of edge 4a with 4b to about a middle point of the edge 4b. The elongated member 10 has a plurality of grooves 12 extending perpendicular to a length thereof. A protrusion 14 projects from an intersection of the edges 4b with 4c of each wall 4.

A spring-biased element 15 has a plate 16 connected perpendicularly with a plate 18. A rib 20 extends on a lower surface of the plate 18. A plurality of protrusions 22 project perpendicularly from the plate 16. Each protrusion 22 slides within a corresponding groove 12 while the rib 20 is restrained between the elongated member 10 and the protrusions 14. A plate 24 projects perpendicularly from the wall 16 above the protrusions 22. Two protrusions 26 each perpendicularly project from a corner of an upper surface of the plate 24. A plurality of protrusions 28 project from a lower surface of the plate 18, corresponding to the grooves 12.

Figure 3:
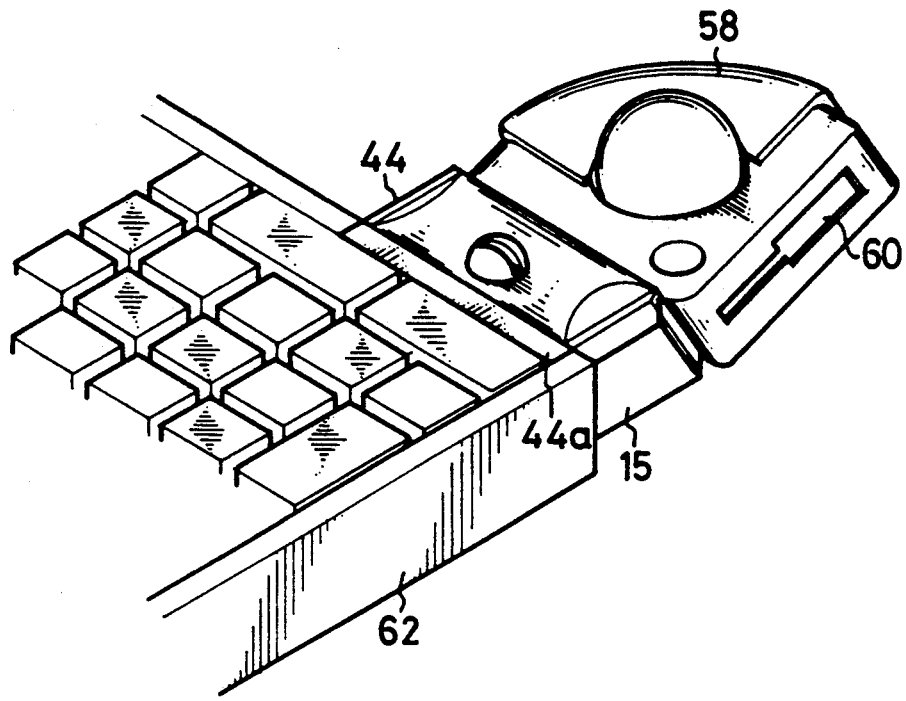
FIG. 3 is a perspective view of a clamp for fastening a shell which encompasses a trackball to a keyboard, clamping a left margin of the keyboard in accordance with the present invention.
Figure 4:
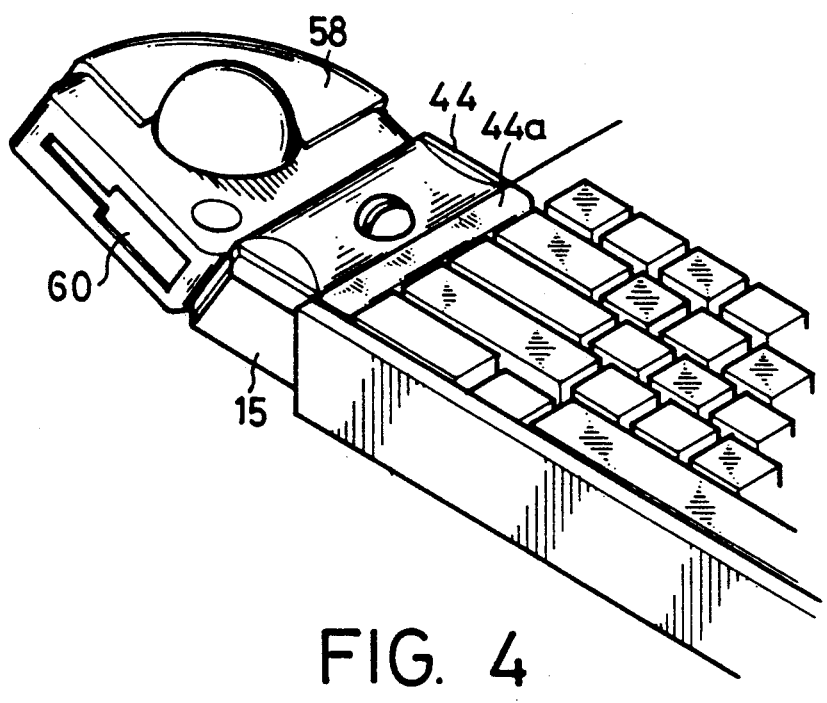
FIG. 4 is a perspective view of a clamp for fastening a shell which encompasses a trackball to a keyboard, clamping a right margin of the keyboard in accordance with the present invention.

A tray 29 has a plate 30 integrally connected with an inclined plate 32 for bearing a shell 58 encompassing a trackball 56 (see FIGS. 3 and 4). The inclined plate 32 on a first surface has a dovetail 34 which could be engaged with a dovetail slot 60 formed in the shell 58, thereby securely carrying the shell 58. A plurality of pairs of tabs 35 project from a second surface of the inclined plate 32, corresponding to the shafts 22. A plurality of hooks 36 project from a lower surface of the plate 30. Each hook 36 could be guided by a corresponding groove 6 to be received in a corresponding cavity 8, thereby anchoring the tray 29 to the base 3. Two guides 38 extend on the lower surface of the plate 32 for guiding the protrusions 26 when the spring-biased element 15 slides relative to the tray 29. A threaded hole 40 is formed in the plate 30. A plurality of holes 42 are formed in the plate 30.

A plurality of compression springs 33 each have a first end for collaring a corresponding shaft 22 and a second flat end to be received in a corresponding pair of tabs 35 to thereby bias the spring-biased element 15 away from the tray 29. A buckle strip 44 has a bent portion 44a, a hole 46 corresponding to the threaded hole 40, and a plurality of holes 48 corresponding to the holes 42. A cover 50 has a plurality of protrusions 52 projecting therefrom. Each protrusion 52 is inserted through corresponding holes 48 and 42 to thereby help position the buckle strip 44 relative to the tray 29. A bolt 56 engages with the threaded hole 40 through the hole 46 to thereby maintain the buckle strip 44 in position.

Referring to FIGS. 3 and 4, the trackball 56 is received in a shell 58. The shell 58 has two adjacent straight sides, each having a dovetail slot 60 for engaging with the dovetail 34.

In FIG. 3, the dovetail 34 engages with the dovetail slot 60 formed in a first straight side of the shell 58. The bent portion 44a of the buckle strip 44 is received in a clearance formed between keys and a right margin of a keyboard 62, while the spring-biased element 15 is biased by the compression spring 44 to abut the right margin, thereby clamping the keyboard 62. As a result, the trackball 56 is maintained in a stable position relative to the keyboard 62. The buckle strip 44 could be replaced with another buckle strip of a different length from the bent portion 44a to an opposite edge to thereby adjust the clamp 2 to various keyboards.

In FIG. 4, the dovetail 34 engages with the dovetail slot 60 formed in a second straight side of the shell 58. The bent portion 44a of the buckle strip 44 is received in a clearance formed between keys and a left margin, while the spring-biased element 15 is biased by the compression spring 44 to abut the left margin, thereby clamping the keyboard 62.

While the present invention has been explained in relation to its preferred embodiment, it is to be understood that variations thereof will be apparent to those skilled in the art upon reading this specification. Therefore, the present invention is intended to cover all such variations as shall fall within the scope of the appended claims.

I claim:

1. A clamp for fastening a shell which encompasses a trackball to a keyboard, comprising:

a base having an elongated member integrally connecting two walls each having a plurality of first grooves each having a cavity, said elongated member having a plurality of second grooves;

a spring-biased element having a first plate connected with a second plate, said first plate having first springpositioning means while said second plate has a plurality of protrusions each for sliding within each said second groove;

a tray having a first plate connected at an obtuse angle with a second plate having second spring-positioning means formed on a first surface and means for binding the shell formed on a second surface, said first plate having a plurality of hooks each guided by each said first groove to be received in each said cavity;

a plurality of compression springs biased between said first means and second means; and a buckle strip being secured to said first plate of said tray and formed with a bent portion beyond the first plate of said spring-biased element.

2. A clamp in accordance with claim 1, wherein said first spring-positioning means comprises a plurality of first shafts.

3. A clamp in accordance with claim 2, wherein said second spring-positioning means comprises a plurality of pairs of tabs corresponding to said first shafts.

4. A clamp in accordance with claim 3, wherein said spring has a first end collaring said first shaft and a second flat end disposed between said pair of tabs.

5. A clamp in accordance with claim 1, wherein said means for bonding the shell comprises a dovetail for engaging with a dovetail slot formed in the shell.

* * * * *